US008446639B2

(12) United States Patent
Jinno

(10) Patent No.: US 8,446,639 B2
(45) Date of Patent: May 21, 2013

(54) INFORMATION PROCESSING METHOD, INFORMATION PROCESSING APPARATUS, AND COMPUTER PROGRAM

(75) Inventor: Takayuki Jinno, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 625 days.

(21) Appl. No.: 12/522,363

(22) PCT Filed: Mar. 13, 2008

(86) PCT No.: PCT/JP2008/055163
§ 371 (c)(1), (2), (4) Date: Jul. 7, 2009

(87) PCT Pub. No.: WO2008/114842
PCT Pub. Date: Sep. 25, 2008

(65) Prior Publication Data

US 2010/0118348 A1 May 13, 2010

(30) Foreign Application Priority Data

Mar. 19, 2007 (JP) ................................ 2007-071197

(51) Int. Cl.
*H04N 1/40* (2006.01)

(52) U.S. Cl.
USPC ............ 358/3.24; 358/1.9; 358/2.1; 347/101; 347/43

(58) Field of Classification Search ................. 358/3.24, 358/1.9, 2.1; 347/101, 43
See application file for complete search history.

(56) References Cited

U.S. PATENT DOCUMENTS

| | | | | |
|---|---|---|---|---|
| 5,370,976 | A * | 12/1994 | Williamson et al. | 430/358 |
| 6,033,055 | A * | 3/2000 | Nagoshi et al. | 347/43 |
| 7,152,950 | B2 * | 12/2006 | Takekoshi et al. | 347/43 |
| 7,491,424 | B2 * | 2/2009 | Hersch et al. | 427/267 |
| 2003/0160850 | A1 * | 8/2003 | Ohya et al. | 347/101 |
| 2004/0233463 | A1 * | 11/2004 | Hersch et al. | 358/1.9 |

FOREIGN PATENT DOCUMENTS

| | | |
|---|---|---|
| JP | 6-171111 | 6/1994 |
| JP | 2003-54016 | 2/2003 |
| JP | 2005-193463 | 7/2005 |
| JP | 2006-177797 | 7/2006 |

OTHER PUBLICATIONS

International Search Report and Written Opinion of PCT/JP2008/055163.

* cited by examiner

*Primary Examiner* — Twyler Haskins
*Assistant Examiner* — Michael Burleson
(74) *Attorney, Agent, or Firm* — Fitzpatrick, Cella, Harper & Scinto

(57) ABSTRACT

Characteristic data representing the metallic luster characteristic of each of a plurality of kinds of printing materials to be used by a printing apparatus is acquired. On the basis of a stimulus value represented by the acquired characteristic data corresponding to each of the plurality of kinds of printing materials, an overlay order is determined to form an image on the printing medium by overlaying a printing material having a smaller stimulus value on a printing material having a large stimulus value. The print data is generated in accordance with the determined overlay order.

18 Claims, 9 Drawing Sheets

INFORMATION PROCESSING METHOD, INFORMATION PROCESSING APPARATUS, AND COMPUTER PROGRAM

TECHNICAL FIELD

The present invention relates to an information processing method and apparatus for generating print data in a printing apparatus which prints an image on a printing medium using a plurality of printing materials, and a computer program.

BACKGROUND ART

Recently, a wordprocessor, personal computer, facsimile apparatus, or the like uses, as an information output apparatus, printing apparatuses of various schemes for printing information of a desired text or image on a sheet-shaped printing medium such as a paper sheet or film. A scheme for forming a text or image on a printing medium by applying a printing material to the printing medium has been put to practical use. A typical example of this scheme is an inkjet printing apparatus. The inkjet printing apparatus has recently improved its performance to print not only a text but also a color image.

On the other hand, along with the improvement of the performance of the color inkjet printing apparatus, it becomes common practice to execute digital image output, i.e., so-called photographic printing using the color inkjet printing apparatus. As the photographic printing becomes popular, importance has been placed on the preservative quality of an output printing medium.

Conventionally, an inkjet printing apparatus mainly uses dye inks as printing materials. However, since the preservative quality of dye inks is poor, some color inkjet printing apparatuses use pigment inks having a high preservative quality. One of remarkable phenomena especially observed in a color inkjet printing apparatus using pigment inks is “bronzing”, i.e., a colored illumination image reflected on the surface of an output printing medium. The bronzing is a disturbing element for an image observer and deteriorates the total image quality.

Some of the above-described inkjet printing apparatuses reproduce a multi-color multi-tone image using a plurality of kinds of inks by overlaying a plurality of kinds of ink dots on a printing medium, as disclosed in Japanese Patent Laid-Open Nos. 2003-54016 and 6-171111.

When colors are reproduced by discharging inks to a printing medium, occurrence of bronzing in the reproduced colors sometimes changes depending on the ink. When a color is reproduced by overlaying a plurality of kinds of inks, occurrence of bronzing in the reproduced color sometimes changes depending on the overlay order. When occurrence of bronzing in a reproduced color is better suppressed, the total image quality can be improved. Conventionally, however, the inks are not overlaid in an appropriate order considering the bronzing.

DISCLOSURE OF INVENTION

The present invention has been made to solve the above-described problem, and has as its object to provide an information processing method and apparatus capable of suitably suppressing occurrence of bronzing in an image formed by overlaying a plurality of kinds of inks, and a computer program.

According to the first aspect of the present invention, an information processing method of generating print data in a printing apparatus for printing an image on a printing medium by using a plurality of kinds of printing materials, comprises: an acquisition step of acquiring characteristic data representing a metallic luster characteristic of each of the plurality of kinds of printing materials to be used by the printing apparatus; a determination step of determining, on the basis of a stimulus value represented by the characteristic data acquired in the acquisition step in correspondence with each of the plurality of kinds of printing materials, an overlay order to form an image on the printing medium by overlaying a printing material having a smaller stimulus value on a printing material having a large stimulus value; and a generation step of generating the print data in accordance with the overlay order determined in the determination step.

In a preferred embodiment, the printing apparatus comprises: a print head unit having a plurality of nozzle groups which discharge the plurality of kinds of printing materials, respectively; a main scan drive unit which executes main scan by driving at least one of the print head unit and the printing medium; and a sub scan drive unit which executes sub scan by driving at least one of the print head unit and the printing medium every time main scan finishes.

In a preferred embodiment, in the acquisition step, the characteristic data is acquired from a measuring device, and the measuring device measures a metallic luster characteristic of a patch image formed by discharging each of the plurality of kinds of printing materials to the printing medium.

In a preferred embodiment, the measuring device measures, as the characteristic data, a value representing a tint of specular reflected light from the printing medium to be measured.

In a preferred embodiment, the measuring device measures a fluctuation in a spectral intensity of the specular reflected light.

In a preferred embodiment, in the generation step, the print data is generated such that the printing materials are overlaid in the same order for all pixels of the image formed on the printing medium by the printing apparatus.

In a preferred embodiment, in the determination step, the overlay order is determined to place, at a top, at least a printing material having a minimum stimulus value of the stimulus values represented by the characteristic data acquired in the acquisition step in correspondence with the plurality of kinds of printing materials.

In a preferred embodiment, the method further comprises: a display step of displaying a print setting screen for setting a print condition, the print setting screen having at least a selection unit to designate the printing medium to be used by the printing apparatus, and a process selection unit to select ON/OFF of execution of the process in the determination step; an input step of inputting the print condition set via the print setting screen; and a control step of controlling execution of the determination step in accordance with the print condition.

According to the second aspect of the present invention, an information processing apparatus for generating print data in a printing apparatus for printing an image on a printing medium by using a plurality of kinds of printing materials, comprises: acquisition means for acquiring characteristic data representing a metallic luster characteristic of each of the plurality of kinds of printing materials to be used by the printing apparatus; determination means for determining, on the basis of a stimulus value represented by the characteristic data acquired by said acquisition means in correspondence with each of the plurality of kinds of printing materials, an overlay order to form an image on the printing medium by overlaying a printing material having a smaller stimulus value on a printing material having a large stimulus value; and generation means for generating the print data in accordance with the overlay order determined by said determination means.

According to the third aspect of the present invention, a computer program which is stored in a computer-readable storage medium to cause a computer to execute an information processing method of generating print data in a printing apparatus for printing an image on a printing medium by using a plurality of kinds of printing materials, the information processing method comprises: an acquisition step of acquiring characteristic data representing a metallic luster characteristic of each of the plurality of kinds of printing materials to be used by the printing apparatus; a determination step of determining, on the basis of a stimulus value represented by the characteristic data acquired in the acquisition step in correspondence with each of the plurality of kinds of printing materials, an overlay order to form an image on the printing medium by overlaying a printing material having a smaller stimulus value on a printing material having a large stimulus value; and a generation step of generating the print data in accordance with the overlay order determined in the determination step.

According to the fourth aspect of the present invention, an information processing apparatus for generating print data in a printing apparatus for printing an image on a printing medium by using a plurality of kinds of printing materials, comprises: input means for inputting image data; first generation means for generating image data corresponding to each of the plurality of kinds of printing materials on the basis of the image data input by said input means; and second generation means for generating the print data on the basis of the image data generated by said first generation means, wherein said second generation means generates the print data, on the basis of characteristic data representing a metallic luster characteristic of each of the plurality of kinds of printing materials, to form an image on the printing medium by overlaying, of the plurality of kinds of printing materials, a printing material having a smaller value represented by the characteristic data on a printing material having a large value represented by the characteristic data.

According to the fifth aspect of the present invention, an information processing method of generating print data in a printing apparatus for printing an image on a printing medium by using a plurality of kinds of printing materials, comprises: an input step of inputting image data; a first generation step of generating image data corresponding to each of the plurality of kinds of printing materials on the basis of the image data input in the input step; and a second generation step of generating the print data on the basis of the image data generated in the first generation step, wherein in the second generation step, the print data is generated, on the basis of characteristic data representing a metallic luster characteristic of each of the plurality of kinds of printing materials, to form an image on the printing medium by overlaying, of the plurality of kinds of printing materials, a printing material having a smaller value represented by the characteristic data on a printing material having a large value represented by the characteristic data.

According to the sixth aspect of the present invention, a program which is stored in a computer-readable storage medium to cause a computer to execute an information processing method of generating print data in a printing apparatus for printing an image on a printing medium by using a plurality of kinds of printing materials, the information processing method comprises: an input step of inputting image data; a first generation step of generating image data corresponding to each of the plurality of kinds of printing materials on the basis of the image data input in the input step; and a second generation step of generating the print data on the basis of the image data generated in the first generation step, wherein in the second generation step, the print data is generated, on the basis of characteristic data representing a metallic luster characteristic of each of the plurality of kinds of printing materials, to form an image on the printing medium by overlaying, of the plurality of kinds of printing materials, a printing material having a smaller value represented by the characteristic data on a printing material having a large value represented by the characteristic data.

Further features of the present invention will become apparent from the following description of exemplary embodiments with reference to the attached drawings.

BEST MODE FOR CARRYING OUT THE INVENTION

A preferred embodiment of the present invention will now be described in detail with reference to the drawings. It should be noted that the relative arrangement of the components, the numerical expressions and numerical values set forth in these embodiments do not limit the scope of the present invention unless it is specifically stated otherwise.

The following embodiment does not limit the scope of the claims of the present invention, and not all combinations of features described in the embodiment are always indispensable for the solving means of the present invention.

<Outline of Apparatus Arrangement>

Figure 1A:
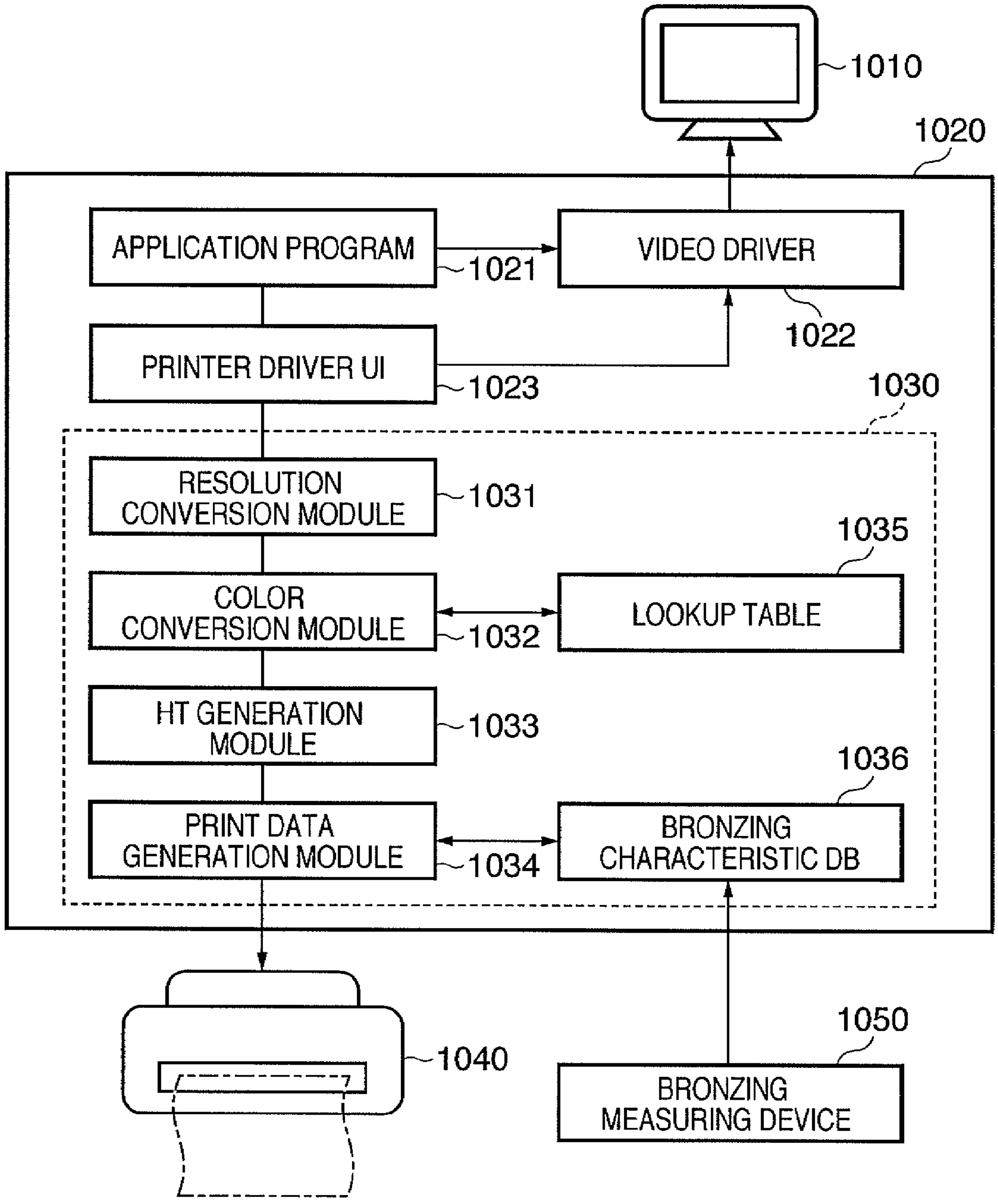
FIG. 1A is a block diagram showing the arrangement of an image forming system according to an embodiment of the present invention.

FIG. 1A is a block diagram showing the arrangement of an image forming system according to an embodiment of the present invention.

This image forming system includes a computer 1020 serving as an image formation control apparatus (information processing apparatus), and a printer 1040 serving as an image forming unit. The combination of the printer 1040 and computer 1020 can be called an "image forming apparatus (or printing apparatus)" in a broad sense.

The printer 1040 is, e.g., a printer or multifunctional peripheral using an inkjet method, or a printer or multifunctional peripheral using an electrophotographic method. The printer 1040 may be a thermal transfer printer, and the type of the image forming apparatus is not limited. Examples of a printing medium used by the printer 1040 for image formation are printing paper sheets such as glossy paper, plain paper, and art paper. However, the present invention is not limited to these. Examples of a printing material used by the printer 1040 for printing are a dye ink, pigment ink, and toner. However, the present invention is not limited to these.

In the computer 1020, an application program 1021 runs under a predetermined operating system. The operating system incorporates a video driver 1022 and a printer driver 1030. The application program 1021 outputs print (image formation) data to be transferred to the printer 1040 via the printer driver 1030. The application program 1021 executes desired processes for a process target image and also displays the image on a display unit 1010 via the video driver 1022.

An example in which an RGB image is handled as an input image will be described. When the application program 1021 issues a print instruction via a printer driver UI (User Interface) 1023, the printer driver 1030 receives image data from the application program 1021. The printer driver 1030 converts the image data into print data to be supplied to the printer 1040.

In the example shown in FIG. 1A, the printer driver 1030 includes a resolution conversion module 1031, color conversion module 1032, HT (halftone) generation module 1033, and print data generation module 1034.

The print data generation module 1034 functions as a print data generation unit of the present invention. The print data generation module 1034 executes an overlay order determination process (to be described later) of determining an overlay order, on a printing medium, of printing materials to be used by the printer 1040 by referring to a bronzing characteristic (metallic luster characteristic) DB (database).

The resolution conversion module 1031 converts the resolution (i.e., the number of pixels per unit length) of color image data handled by the application program 1021 into a resolution processible by the printer driver 1030. The image data that has undergone resolution conversion is still image information containing three colors R, G, and B.

The color conversion module 1032 converts the RGB image data (first image data) of each pixel into multi-tone data (second image data) of a plurality of ink colors usable by the printer 1040 by looking up a lookup table (LUT) 1035. The converted multi-tone data has, e.g., 256 tone values.

The HT (halftone) generation module 1033 executes a halftone process for the image data to express the tone values of the multi-tone data by dispersing, on a printing medium, ink dots to be output from the printer 1040. The print data generation module 1034 rearranges the halftone-processed image data in an order of data transfer to the printer 1040 and outputs final print data to the printer 1040. The print data includes raster data representing the printing states of dots in every main scan and data representing the sub scan feed amount of the printing medium to be conveyed through the printer 1040.

The printer driver 1030 corresponds to a program for implementing a print data generation function (information processing method). The program for implementing the function of the printer driver 1030 is recorded on a computer-readable recording medium and supplied.

Various kinds of computer-readable media are usable as the recording medium. Examples of the media are a flexible disk, CD-ROM, magnetooptical disk, IC card, ROM cartridge, punch card, and printed product with a printed code such as a barcode. Other examples of the media are an internal storage device (a memory such as a RAM or ROM) and external storage device of a computer.

The apparatus arrangement is not limited to this. For example, the modules 1031 to 1036 (including the LUT 1035) of the printer driver 1030 may be installed as an application program separated from the printer driver 1030.

A bronzing measuring device 1050 measures the bronzing (metallic luster) characteristic of a monochrome solid patch image of an ink, which is printed on a printing medium by the printer 1040, and outputs the measurement result (characteristic data) to the bronzing characteristic DB 1036 of the computer 1020. The computer 1020 can control the measurement process of the bronzing measuring device 1050 and acquire an obtained measurement result.

The hardware configuration of the computer 1020 will be described next with reference to FIG. 1B.

Figure 1B:
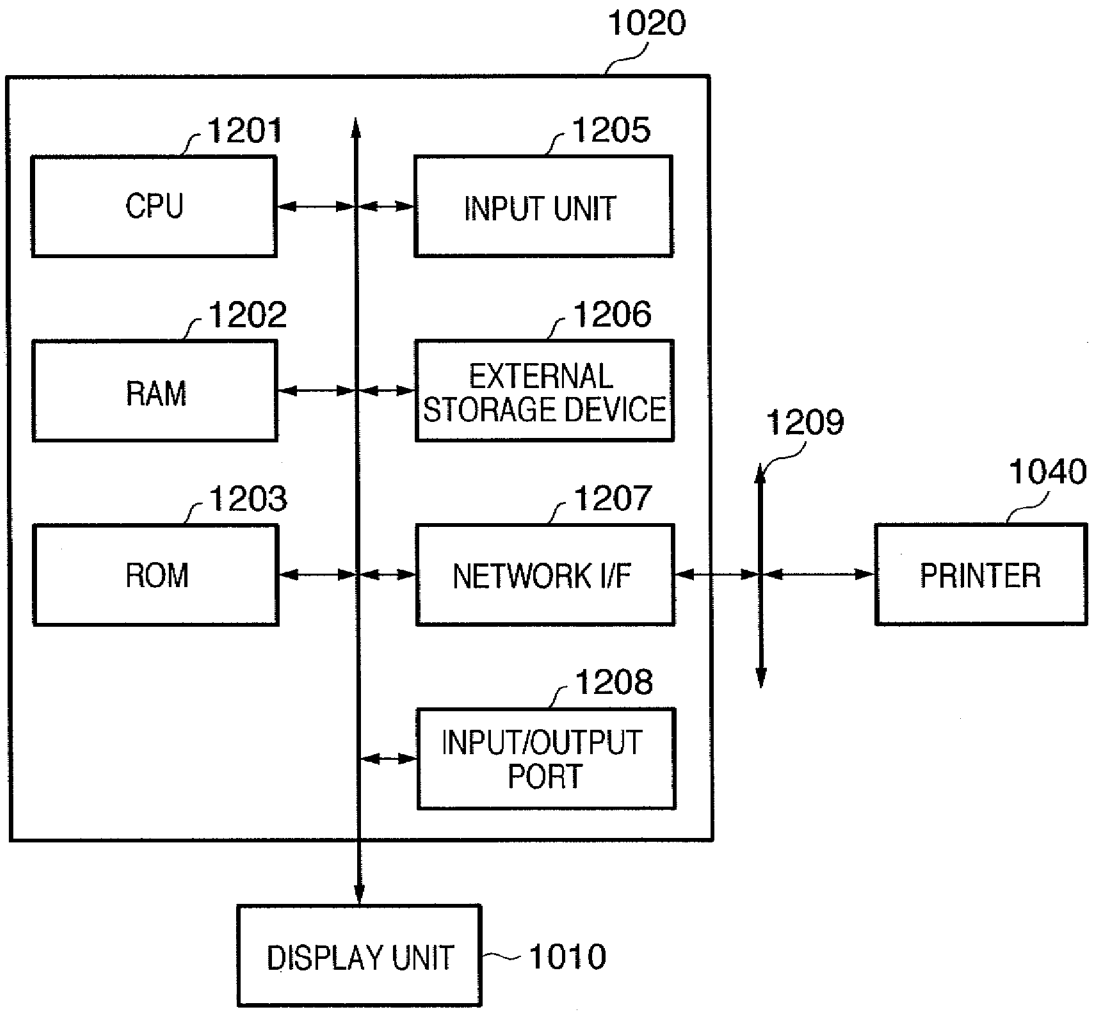
FIG. 1B is a block diagram showing the hardware configuration of a computer according to the embodiment of the present invention.

FIG. 1B is a block diagram showing the hardware configuration of the computer according to the embodiment of the present invention.

Referring to FIG. 1B, a CPU 1201 controls the entire operation of the computer 1020 serving as an image forming control apparatus in accordance with programs stored in a RAM 1202 and a ROM 1203. The RAM 1202 serves as the main memory of the CPU 1201, in which a program to be executed by the CPU 1201 is loaded. The RAM 1202 also provides a work area which temporarily saves various data during the control operation of the CPU 1201. The ROM 1203 nonvolatilely stores boot programs and various data.

The display unit 1010 has a CRT or liquid crystal display device, which is used to display data to be processed or a UI screen (to be described later). An input unit 1205 has a keyboard and a pointing device such as a mouse, which are used by the user to input various data and commands.

An external storage device 1206 is a mass storage device such as a hard disk. An OS, various application programs, printer driver, and data are installed in advance in the external storage device 1206. When the user instructs to activate a program, it is loaded in the RAM 1202 and executed.

A network interface (I/F) 1207 controls the interface to a network 1209 such as a LAN. The printer 1040 and various kinds of input/output devices are connected to the network 1209. An input/output port 1208 is an interface such as a USB or IEEE1394.

<UI Unit>

An example of the printer driver UI 1023 will be described next with reference to FIG. 2.

Figure 2:
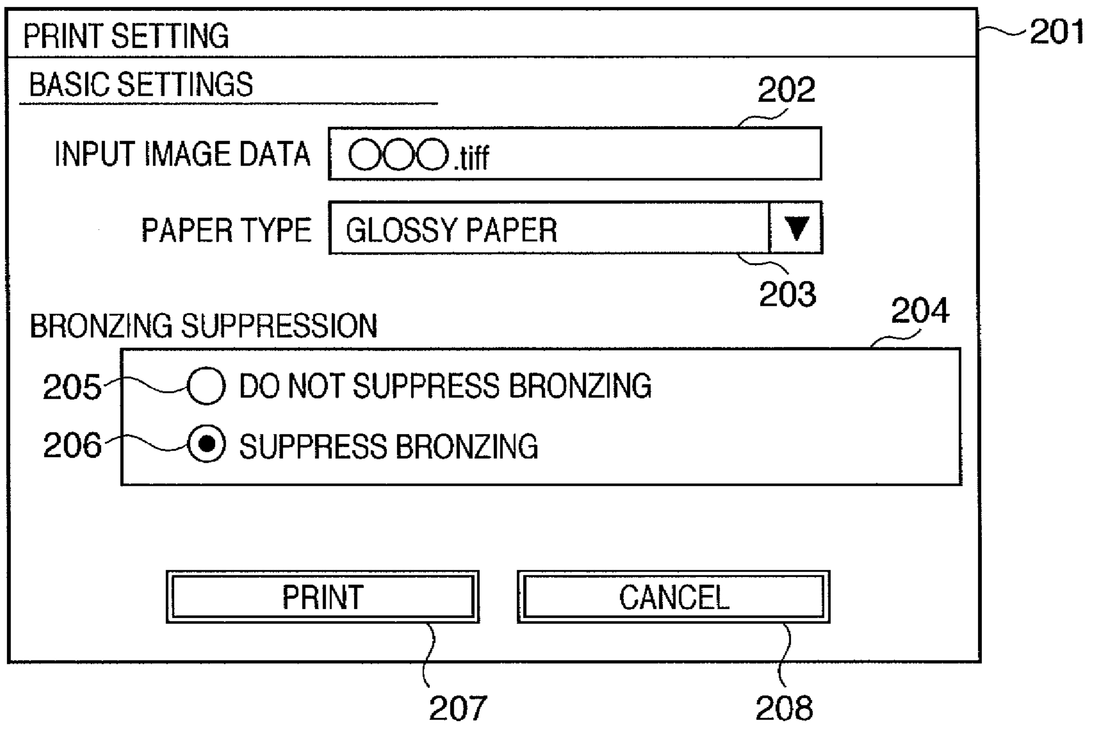
FIG. 2 is a view showing an example of a printer driver UI according to the embodiment of the present invention.

FIG. 2 is a view showing an example of the printer driver UI according to the embodiment of the present invention.

FIG. 2 shows a print setting screen 201 of the printer driver UI 1023. An input text box 202 is a control to designate or input desired image data to be printed. The user inputs information such as an image data file name to the input text box 202. A combo box 203 is a control (selection unit) to select a printing medium to be used for printing. The combo box 203 allows the user to select an arbitrary one of all kinds of printing media usable in the printer 1040.

A group box 204 is a control (process selection unit) to alternately select a radio button 205 or 206. The group box 204 has a function of selecting only one of the radio buttons 205 and 206. The radio button 205 is a control to select a mode not to execute (to inhibit) a bronzing suppression process. The radio button 206 is a control to select a mode to execute a bronzing suppression process. That is, the radio buttons 205 and 206 function as controls to implement ON/OFF of the bronzing suppression process.

When the user selects (checks) the radio button 205, the printer 1040 prints an image on a printing medium by overlaying printing materials in an order not to execute the bronzing suppression process. On the other hand, when the user selects (checks) the radio button 206, the printer 1040 prints an image on a printing medium by overlaying printing materials in an order to execute the bronzing suppression process (overlay order determination process).

Note that the printer driver 1030 (print data generation module 1034) executes the bronzing suppression process. This process will be described later in detail.

A print button 207 is a control to set various settings on the print setting screen 201 as print conditions, store them in the RAM 1202, and instruct execution of printing based on the print conditions. More specifically, the print button 207 transmits the image data and print conditions related to the bronzing suppression process to the printer driver 1030. A cancel button 208 is a control to cancel various settings on the print setting screen 201.

The various controls such as the text box, combo box, radio buttons, and group box in the print setting screen 201 are mere examples. Hence, any other objects having the same functions can also be used without any problem.

<Bronzing Measuring Unit>

A method of measuring the bronzing characteristics of color materials to be stored in the bronzing characteristic DB (database) 1036 will be described next with reference to FIGS. 3 to 6. The bronzing measuring device 1050 implements this measurement.

Figure 3:
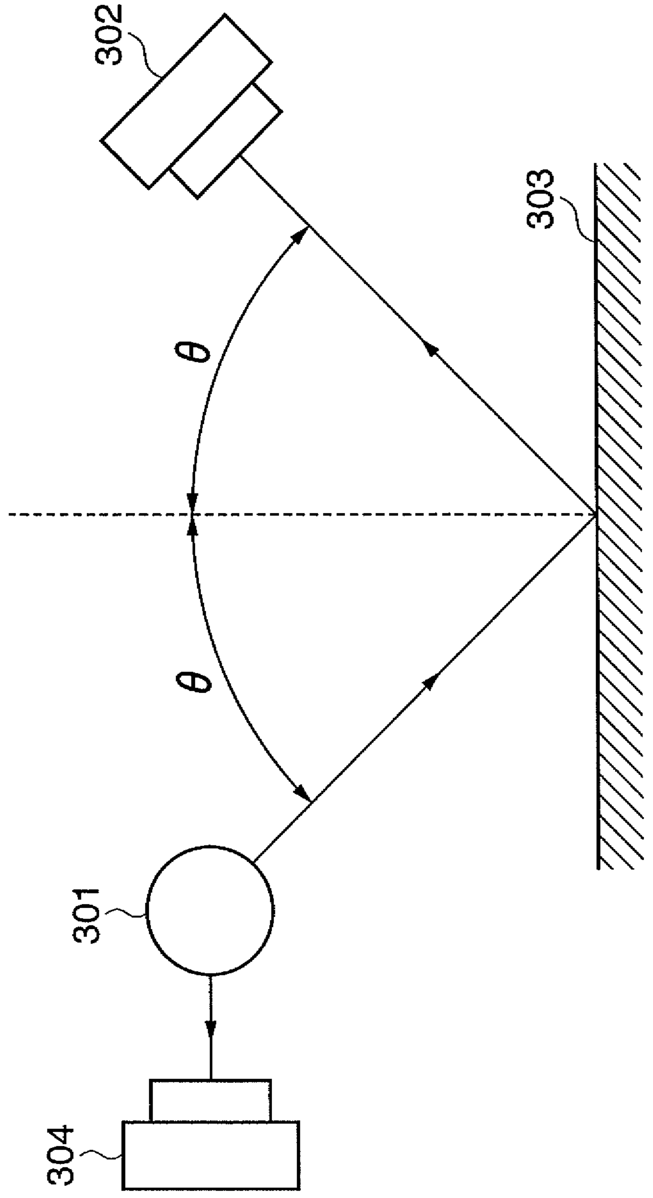
FIG. 3 is a conceptual view showing the geometrical optical system of a bronzing measuring device according to the embodiment of the present invention.

FIG. 3 is a conceptual view showing the geometrical optical system of the bronzing measuring device according to the embodiment of the present invention.

An illumination unit (light source) 301 illuminates a printing medium 303 to be evaluated. A halogen lamp, xenon lamp, ultra-high pressure mercury lamp, deuterium lamp, LED, or a combination thereof is usable as the illumination unit 301.

A light detection unit (light reception unit) 302 detects specular reflected light from the printing medium 303 to be evaluated. A single-element light receiving surface type photodiode, phototube, photomultiplier tube, multi-element light receiving surface type Si-photodiode array, or CCD is usable as the detector of the light detection unit 302. The light detection unit 302 also has a beam splitter such as a diffraction grating or prism which spectrally splits light. The light detection unit 302 is located at a position on the opposite side of the illumination unit 301 while being tilted by the same angle θ as the illumination unit 301 with respect to the normal to the printing medium 303. That is, the light detection unit 302 is located in the specular reflection direction. Each of the illumination unit 301 and light detection unit 302 may have an optical system (e.g., lens).

Reference numeral 303 denotes the printing medium to be evaluated. The printing medium 303 is preferably kept as flat as possible by a fixing unit using electrostatic absorption or suction by an air pump.

A light detection unit 304 detects light of the illumination unit 301. The light detection unit 304 is the same as the light detection unit 302 and particularly measures the spectral intensity of the illumination unit 301 to calculate a bronzing generation amount. The light detection unit 302 may measure the spectral intensity of specular reflected light from a white plate such as a perfect reflecting diffuser, or a mirror surface as the spectral intensity of the illumination unit 301. Alternatively, a light detection unit different from the light detection unit 302 may measure light obtained by splitting illumination light using a beam splitter or the like.

A method (bronzing calculation process) of calculating a bronzing characteristic (bronzing generation amount) from measured specular reflected light from a printing medium will be described next with reference to FIG. 4.

Figure 4:
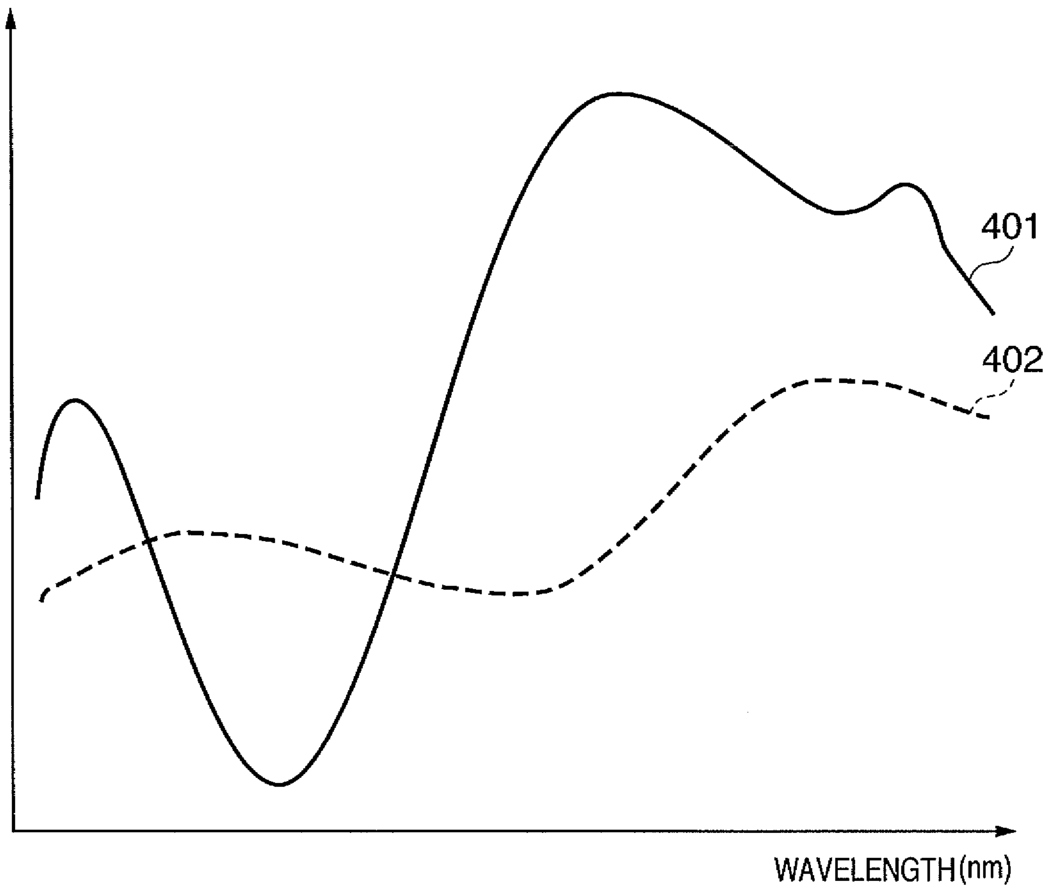
FIG. 4 is a graph for explaining a method of calculating a bronzing characteristic according to the embodiment of the present invention.

FIG. 4 is a graph for explaining the method of calculating a bronzing characteristic according to the embodiment of the present invention.

The bronzing calculation process of calculating a bronzing characteristic is executed as, e.g., part of the overlay order determination process of the print data generation module 1034 of the printer driver 1030 of the computer 1020 on the basis of a measurement result obtained from the bronzing measuring device 1050. However, the bronzing measuring device 1050 may have the function of implementing the bronzing calculation process and execute the bronzing calculation process.

FIG. 4 shows measurement examples of the spectral intensities of two kinds of samples A and B. Reference numeral 401 represents a spectral intensity of the sample A having a bronzing generation amount relatively larger than a threshold value. Reference numeral 402 represents a spectral intensity of the sample B having a bronzing generation amount relatively smaller than the threshold value.

On the basis of a spectral intensity $R_x(\lambda)$ of specular reflected light from the printing medium 303 measured by the light detection unit 302, tristimulus values Xx, Yx, and Zx of the specular reflected light are calculated by $$X_X = \int_{380}^{780} R_X(\lambda)\bar{x}(\lambda)\,d\lambda \qquad (1)$$

$$Y_X = \int_{380}^{780} R_X(\lambda)\bar{y}(\lambda)\,d\lambda$$

$$Z_X = \int_{380}^{780} R_X(\lambda)\bar{z}(\lambda)\,d\lambda$$

In equation (1), since the optical system shown in FIG. 3 measures specular reflected light, the range of the measurement value of specular reflected light from, e.g., glossy paper having a large degree of gloss is close to the range of the measurement value of the light source. That is, the system is similar to a measuring system for directly measuring light from a light source.

Hence, unlike calculating the tristimulus values of object colors by normal reflection, the tristimulus values are calculated in accordance with the method of calculating the tristimulus values of the light source color by regarding the spectral intensity of the specular reflected light as the relative spectral distribution of the light source. In equations (1), $\bar{x}(\lambda)$, $\bar{y}(\lambda)$, and $\bar{z}(\lambda)$ are color matching functions of JIS Z 8782. In this embodiment, normalization using a constant of proportionality is not performed. However, normalization may be done by, e.g., multiplying $$K = \frac{100}{\int_{380}^{780} \bar{y}(\lambda)\,d\lambda} \qquad (2)$$

On the basis of a spectral intensity s(λ) of the illumination measured by the light detection unit 304, tristimulus values Xs, Ys, and Zs of the illumination are calculated by $$X_S = k\int_{380}^{780} S(\lambda)\bar{x}(\lambda)\,d\lambda \tag{3}$$

$$Y_S = k\int_{380}^{780} S(\lambda)\bar{y}(\lambda)\,d\lambda$$

$$Z_S = k\int_{380}^{780} S(\lambda)\bar{z}(\lambda)\,d\lambda$$

$$Z_s = k\int_{380}^{780} S(\lambda)\bar{z}(\lambda)d\lambda \tag{3}$$

Equations (3) based on the method of calculating the tristimulus values of the light source color are transformations for calculating the tristimulus values Xs, Ys, and Zs from the spectral data of the illumination.

In equations (3), $\bar{x}(\lambda)$, $\bar{y}(\lambda)$, and $\bar{z}(\lambda)$ are color matching functions of JIS Z 8782. In equation (3), k is a constant of proportionality which is defined to make the value Ys of the tristimulus values match the measured light amount.

Next, the tristimulus values Xx, Yx, and Zx of specular reflection from the printing medium 303 as an evaluation target detected by the light detection unit 302, and the tristimulus values Xs, Ys, and Zs of the illumination detected by the light detection unit 304 are acquired. On the basis of the tristimulus values Xx, Yx, and Zx and the tristimulus values Xs, Ys, and Zs, the L*a*b* values, in the CIE-Lab color space, of the specular reflected light from the printing medium 303 are calculated in accordance with equations (1) to (4) defined by JIS Z 8729.

Equations (1) to (4) defined by JIS Z 8729 are described in, e.g., JIS Handbook: Color (issued by Japanese Standards Association, Jan. 31, 2002).

The tristimulus values (Xx, Yx, and Zx) of the specular reflected light from the printing medium 303 are used as the values X, Y, and Z in equations (1) to (4) of JIS Z 8729. The tristimulus values (Xs, Ys, and Zs) of the light source are used as the values Xn, Yn, and Zn. That is, the values a* and b* are calculated by $$a^* = 500\left[f\left(\frac{X_x}{X_s}\right) - f\left(\frac{Y_x}{Y_s}\right)\right]$$

$$b^* = 200\left[f\left(\frac{Y_x}{Y_s}\right) - f\left(\frac{Z_x}{Z_s}\right)\right]$$

In this case, $$\text{when } \frac{X_x}{X_s} > 0.008856,\ f\left(\frac{X_x}{X_s}\right) = \left(\frac{X_x}{X_s}\right)^{\frac{1}{3}} \tag{4}$$

$$\text{when } \frac{X_x}{X_s} \le 0.008856,\ f\left(\frac{X_x}{X_s}\right) = 7.78\frac{X_x}{X_s} + \frac{16}{116}$$

$$\text{when } \frac{Y_x}{Y_s} > 0.008856,\ f\left(\frac{Y_x}{Y_s}\right) = \left(\frac{Y_x}{Y_s}\right)^{\frac{1}{3}}$$

$$\text{when } \frac{Y_x}{Y_s} \le 0.008856,\ f\left(\frac{Y_x}{Y_s}\right) = 7.78\frac{Y_x}{Y_s} + \frac{16}{116}$$

$$\text{when } \frac{Z_x}{Z_s} > 0.008856,\ f\left(\frac{Z_x}{Z_s}\right) = \left(\frac{Z_x}{Z_s}\right)^{\frac{1}{3}}$$

$$\text{when } \frac{Z_x}{Z_s} \le 0.008856,\ f\left(\frac{Z_x}{Z_s}\right) = 7.78\frac{Z_x}{Z_s} + \frac{16}{116}$$

Bronzing is relevant not to the brightness of the reflected illumination image but to its tint (a value representing a tint). Hence, in this embodiment, the value L* representing the brightness is not used for evaluation. In the example described in this embodiment, the L*a*b* values are calculated using a spectral intensity obtained by using a diffraction grating or the like. However, the light detection unit 302 may photoelectrically directly read the tristimulus values X, Y, and Z by using, e.g., a color filter. The same discussion can hold using any other spectral characteristic value (a value representing a tint) such as a spectral radiance in place of a spectral intensity.

An example of a bronzing characteristic measurement result will be described next with reference to FIG. 5.

Figure 5:
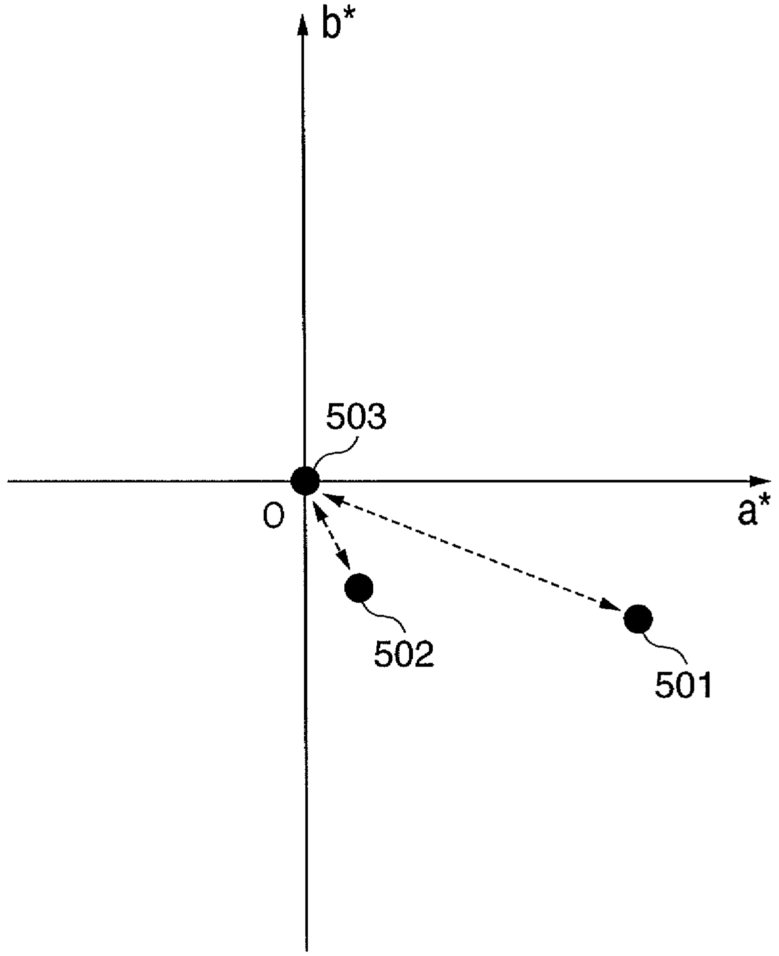
FIG. 5 is a view showing an example of a bronzing characteristic measurement result according to the embodiment of the present invention.

FIG. 5 is a view showing an example of a bronzing characteristic measurement result according to the embodiment of the present invention.

Reference numeral 501 denotes a bronzing characteristic of the sample A represented by the spectral intensity 401 in FIG. 4; 502, a bronzing characteristic of the sample B represented by the spectral intensity 402 in FIG. 4; and 503, the illumination unit (light source) 301 plotted on the a*b* plane. The bronzing generation amount is evaluated based on the magnitude of the ab chroma (i.e., the distance from the origin on the a*b* plane).

A method of evaluating the bronzing generation amount based on the magnitude of the ab chroma has been described. However, the present invention is not limited to this. For example, any other data such as the difference between the maximum value and the minimum value of the spectral intensity in FIG. 4, or the fluctuation (e.g., standard deviation) in the spectral intensity in the direction of intensity is also usable if it represents the magnitude of coloring of specular reflected light.

<Overlay Order Determination Unit>

An overlay order determination process which is executed by the print data generation module 1034 to determine the overlay order of ink dots used by the printer 1040 in FIG. 1 for printing on a printing medium will be described next with reference to FIG. 6.

Figure 6:
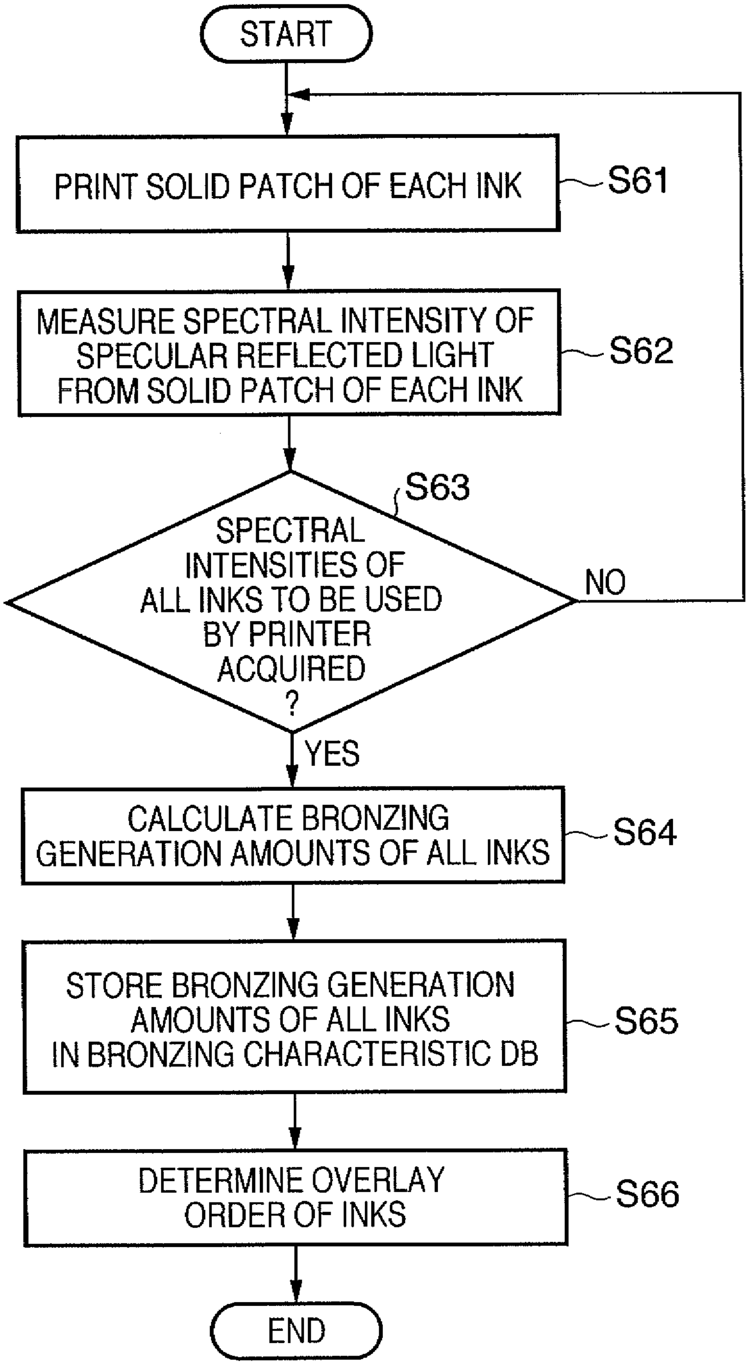
FIG. 6 is a flowchart illustrating an overlay order determination process by a print data generation module according to the embodiment of the present invention.

FIG. 6 is a flowchart illustrating the overlay order determination process by the print data generation module according to the embodiment of the present invention.

In step S61, the computer 1020 controls the printer 1040 to print, on a printing medium, the monochrome solid patch images of all inks provided in the printer 1040. At this time, a predetermined OHP sheet or PET sheet may be used as the printing medium. A printing paper sheet to be used for actual printing may be used. The printing medium to be used for patch image printing is designated in the combo box 203 of the print setting screen 201.

In step S62, the computer 1020 controls the bronzing measuring device 1050 to measure the spectral intensity of specular reflected light from each of monochrome solid patch images of all colors printed in step S61.

In step S63, the computer 1020 determines whether the spectral intensity of specular reflected light is acquired from the bronzing measuring device 1050 for all kinds of inks provided in the printer 1040. If measurement of the spectral intensity of specular reflected light is not done for all kinds of inks provided in the printer 1040 (NO in step S63), the process in steps S61 and S62 is repeated.

If measurement of the spectral intensity of specular reflected light is done for all kinds of inks provided in the printer 1040 (YES in step S63), the bronzing generation amount is calculated for all kinds of inks in step S64. The bronzing generation amount is calculated by the bronzing calculation process described with reference to FIGS. 4 and 5.

The print data generation module 1034 of the printer driver 1030 of the computer 1020 executes the bronzing calculation process, as described above.

In step S65, the computer 1020 stores the calculated bronzing generation amounts in the bronzing characteristic DB 1036 shown in FIG. 1 as characteristic data.

In step S66, the printer driver 1030 (print data generation module 1034) executes the bronzing suppression process (overlay order determination process) to determine, using the obtained bronzing generation amounts, the overlay order of inks for printing with minimum bronzing. More specifically, the print data generation module 1034 generates print data such that an ink with the smallest bronzing generation amount per pixel of the image is placed at the top on the printing medium. This suppresses occurrence of bronzing in the output image formed on the printing medium.

When the process in FIG. 6 is executed for each printing medium designated in the combo box 203 of the print setting screen 201, the bronzing characteristic DB 1036 can manage the bronzing characteristic data of each printing medium.

<Head Unit>

An example of the print head unit of the printer 1040, which discharges printing materials (inks) to form an image on a printing medium, will be described next with reference to FIG. 7.

Figure 7:
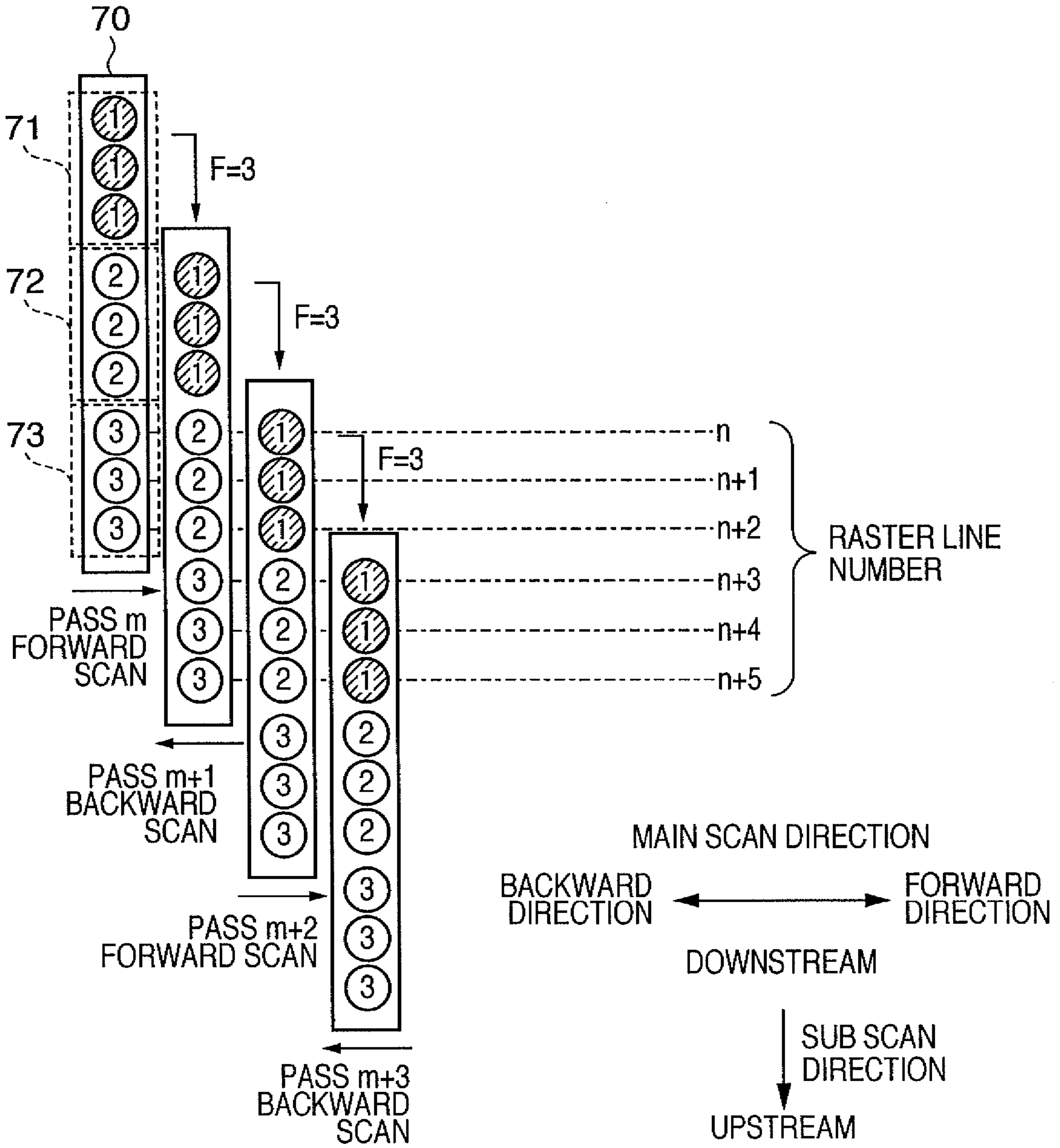
FIG. 7 is a view showing an example of the print head unit of a printer according to the embodiment of the present invention.

FIG. 7 is a view showing an example of the print head unit of the printer according to the embodiment of the present invention.

The printer 1040 serving as a printing apparatus includes a print head unit having a plurality of nozzle groups which discharge a plurality of kinds of printing materials, respectively. The printer 1040 also includes a main scan drive unit which executes main scan by driving at least one of the print head unit and the printing medium, and a sub scan drive unit which executes sub scan by driving at least one of the print head unit and the printing medium every time main scan finishes.

In this embodiment, the main scan direction in which the print head unit is scanned is perpendicular to the sub scan direction in which the printing medium is conveyed. Three color mixing nozzle groups 71, 72, and 73 arranged on a print head unit 70 are aligned along the sub scan direction. Hence, the three color mixing nozzle groups 71, 72, and 73 are arranged not to overlap each other regarding the direction (sub scan direction) perpendicular to the main scan direction.

For example, the nozzle group 71 discharges cyan ink. The nozzle group 72 discharges magenta ink. The nozzle group 73 discharges yellow ink.

Sub scan positions of the print head unit 70 in the repetitive main scan are illustrated on the left side of FIG. 7. "Pass" on the lower of the print head unit 70 indicates a number representing the number of times of main scan. For example, "pass m+1" indicates the (m+1)th main scan (m: integer). The print head unit 70 represented by "pass m+1" indicates the sub scan position of the print head unit 70 in the (m+1)th main scan.

"F" added to an arrow connecting two print heads (e.g., pass m+1 and pass m+2) in FIG. 7 indicates the feed amount (conveyance amount) of the printing medium by sub scan feed that is executed between two main scan cycles. The unit of the feed amount is "dots" (a dot pitch corresponding to the printing resolution in the sub scan direction). In the example shown in FIG. 7, every time main scan is ended, sub scan feed is executed by the feed amount F of 3 dots.

In the example shown in FIG. 7, the print head unit 70 can reciprocally scan within a predetermined scan range (maximum printable range in the main scan direction) from the home position at one end of the range to the other end. Especially, in this embodiment, printing executed by only scanning in the forward direction (one-way direction) from the home position is called one-way printing, and printing executed by scanning in both of the forward direction and the backward direction is called two-way printing.

FIG. 7 illustrates two-way printing of the two kinds of printing. The two-way printing indicates printing for forming ink dots not only during forward scan but also during backward scan of the main scan operation of the print head unit 70 with respect to the printing medium, as described above. Each nozzle prints pixels at all pixel positions on each raster line in one scan cycle.

On the right side of FIG. 7, a dotted line connects a nozzle to be used to print a raster line (also called a main scan line) to a raster line number. For example, a raster line having a raster line number n+2 (n: integer) is printed in three scan cycles including pass m (forward scan) by the yellow nozzle group 73, pass m+1 (backward scan) by the magenta nozzle group 72, and pass m+2 (forward scan) by the cyan nozzle group 71.

The remaining raster lines are also formed by overlaying ink dots of three inks (yellow, magenta, and cyan) in the order of yellow, magenta, and cyan in three scan cycles. In all raster lines, the inks are overlaid in the order of yellow, magenta, and cyan, i.e., in the same order as the nozzle groups (yellow nozzle group 73, magenta nozzle group 72, and cyan nozzle group 71) from upstream to downstream of the sub scan direction (along the printing medium conveyance direction).

An example of an overlaid state of ink dots of pigment inks which generate large bronzing amounts will be described next with reference to FIG. 8. An example to be described in which the bronzing generation amount becomes smaller in the order of yellow, magenta, and cyan.

Figure 8:
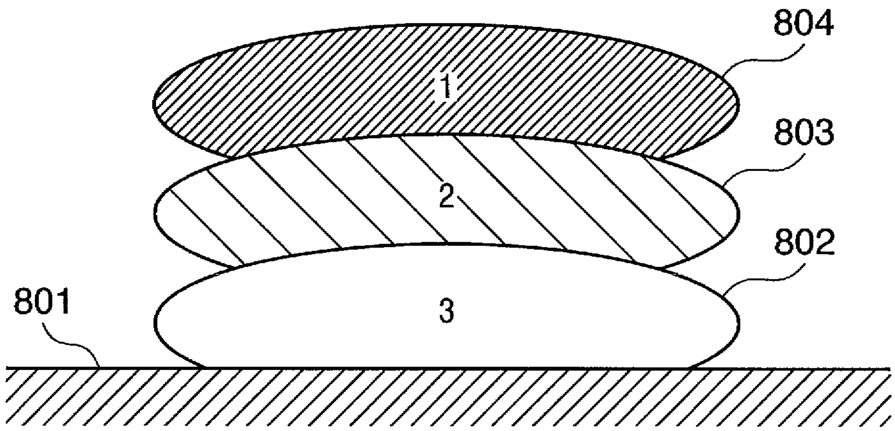
FIG. 8 is a view showing an example of an overlaid state of ink dots of pigment inks which generate large bronzing amounts according to the embodiment of the present invention.

FIG. 8 is a view showing an example of an overlaid state of ink dots of pigment inks which generate large bronzing amounts according to the embodiment of the present invention.

In FIG. 8, a yellow dot 802, magenta dot 803, and cyan dot 804 stick to a surface of a printing medium 801 while being overlaid in accordance with the order of nozzle groups from upstream to downstream of the print head unit 70 shown in FIG. 7. In this case, the cyan dot 804 of the top layer is most relevant to occurrence of bronzing. In other words, the overlay order of the printing materials is determined such that at least the printing material with the smallest bronzing generation amount, i.e., cyan is placed at the top.

In this way, all color mixing nozzle groups of the print head unit 70 are arranged not to overlap each other in the sub scan direction. This enables to overlay the inks in the same order in all raster lines while executing two-way printing. According to this arrangement, it is possible to overlay an ink having a small bronzing generation amount on an ink having a large bronzing generation amount. Occurrence of color unevenness can also be suppressed.

An example of three color mixing inks has been described. However, the present invention is not limited to this. When spot color inks or light color inks are used, i.e., when four or more color mixing inks are used, the same discussion can hold.

For example, when the type of inks to be employed is changed, the ink insertion positions are changed similarly in consideration of bronzing generation amounts.

The printing method is not limited to the above-described method if the overlay order can be determined uniquely.

Two-way printing has been described in FIG. 7. However, the present invention is also applicable to one-way printing.

As described above, according to this embodiment, printing using a plurality of kinds of specific color mixing inks can be controlled to overlay, on a printing medium, an ink having a smaller bronzing generation amount on an ink having a large bronzing generation amount. This more effectively suppresses occurrence of bronzing in a color reproduced on the printing medium.

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or script data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-071197 filed on Mar. 19, 2007, which is hereby incorporated by reference herein in its entirety.

The invention claimed is:

1. An information processing method of generating print data in a printing apparatus for printing an image on a printing medium by using a plurality of kinds of printing materials, comprising:

an acquisition step of acquiring characteristic data representing a metallic luster characteristic of each of the plurality of kinds of printing materials to be used by the printing apparatus by measuring a tint of specularly reflected light for each of the plurality of kinds of printing materials as a bronzing generation amount;

a determination step of determining, on the basis of a stimulus value represented by the characteristic data acquired in the acquisition step in correspondence with each of the plurality of kinds of printing materials, an overlay order to form an image on the printing medium by overlaying a printing material having a smaller stimulus value on a printing material having a larger stimulus value; and a generation step of generating the print data in accordance with the overlay order determined in the determination step.

2. The information processing method according to claim 1, wherein the printing apparatus comprises:

a print head unit having a plurality of nozzle groups which discharge the plurality of kinds of printing materials, respectively;

a main scan drive unit which executes main scan by driving at least one of the print head unit and the printing medium; and a sub scan drive unit which executes sub scan by driving at least one of the print head unit and the printing medium every time main scan finishes.

3. The information processing method according to claim 1, wherein in the acquisition step, the characteristic data is acquired from a measuring device, and the measuring device measures specularly reflected light from patch images formed by respectively discharging each of the plurality of kinds of printing materials to the printing medium.

4. The information processing method according to claim 3, wherein the measuring device measures a fluctuation in a spectral intensity of the specularly reflected light.

5. The information processing method according to claim 1, wherein in the generation step, the print data is generated such that the printing materials are overlaid in the same order for all pixels of the image formed on the printing medium by the printing apparatus.

6. The information processing method according to claim 1, wherein in the determination step, the overlay order is determined to place, at a top, at least a printing material having a minimum stimulus value of the stimulus values represented by the characteristic data acquired in the acquisition step in correspondence with the plurality of kinds of printing materials.

7. The information processing method according to claim 1, further comprising:

a display step of displaying on a display screen a print setting screen for setting a print condition, the print setting screen having at least a selection unit to designate the printing medium to be used by the printing apparatus, and a process selection unit to select an execution of the process in the determination step;

an input step of inputting the print condition set via the print setting screen; and a control step of controlling execution of the determination step in accordance with the print condition.

8. An information processing apparatus for generating print data in a printing apparatus for printing an image on a printing medium by using a plurality of kinds of printing materials, comprising:

an acquisition unit that acquires characteristic data representing a metallic luster characteristic of each of the plurality of kinds of printing materials to be used by the printing apparatus by measuring a tint of specularly reflected light for each of the plurality of kinds of printing materials as a bronzing generation amount;

a determination unit that determines, on the basis of a stimulus value represented by the characteristic data acquired by the acquisition unit in correspondence with each of the plurality of kinds of printing materials, an overlay order to form an image on the printing medium by overlaying a printing material having a smaller stimulus value on a printing material having a larger stimulus value; and a generation unit that generates the print data in accordance with the overlay order determined by the determination unit.

9. The information processing apparatus according to claim 8, wherein the printing apparatus comprises:

a print head unit having a plurality of nozzle groups which discharge the plurality of kinds of printing materials, respectively;

a main scan drive unit which executes main scan by driving at least one of the print head unit and the printing medium; and a sub scan drive unit which executes sub scan by driving at least one of the print head unit and the printing medium every time main scan finishes.

10. The information processing apparatus according to claim 8, wherein the acquisition unit is configured to acquire the characteristic data from a measuring device, and the measuring device measures specularly reflected light from patch images formed by respectively discharging each of the plurality of kinds of printing materials to the printing medium.

11. The information processing apparatus according to claim 10, wherein the measuring device measures a fluctuation in a spectral intensity of the specularly reflected light.

12. The information processing apparatus according to claim 8, wherein the generation unit generates the print data such that the printing materials are overlaid in the same order for all pixels of the image formed on the printing medium by the printing apparatus.

13. The information processing apparatus according to claim 8, wherein the determination unit determines the overlay order to place, at a top, at least a printing material having a minimum stimulus value of the stimulus values represented by the characteristic data acquired by the acquisition unit in correspondence with the plurality of kinds of printing materials.

14. The information processing apparatus according to claim 8, further comprising:

a display unit that displays a print setting screen for setting a print condition, the print setting screen having at least a selection unit to designate the printing medium to be used by the printing apparatus, and a process selection unit to select an execution of the process in the determination unit;

an input unit that inputs the print condition set via the print setting screen; and a controller that controls execution of the determination unit in accordance with the print condition.

15. A non-transitory computer-readable storage medium storing a computer program configured to cause a computer to execute an information processing method of generating print data in a printing apparatus for printing an image on a printing medium by using a plurality of kinds of printing materials, the information processing method comprising:

an acquisition step of acquiring characteristic data representing a metallic luster characteristic of each of the plurality of kinds of printing materials to be used by the printing apparatus by measuring a tint of specularly reflected light for each of the plurality of kinds of printing materials as a bronzing generation amount;

a determination step of determining, on the basis of a stimulus value represented by the characteristic data acquired in the acquisition step in correspondence with each of the plurality of kinds of printing materials, an overlay order to form an image on the printing medium by overlaying a printing material having a smaller stimulus value on a printing material having a larger stimulus value; and a generation step of generating the print data in accordance with the overlay order determined in the determination step.

16. An information processing apparatus for generating print data in a printing apparatus for printing an image on a printing medium by using a plurality of kinds of printing materials, comprising:

an input unit that inputs image data;

a first generation unit that generates image data corresponding to each of the plurality of kinds of printing materials on the basis of the image data input by the input unit; and a second generation unit that generates the print data on the basis of the image data generated by the first generation unit, wherein the second generation unit generates the print data, on the basis of characteristic data representing a metallic luster characteristic of each of the plurality of kinds of printing materials obtained by measuring a tint of specularly reflected light for each of the plurality of kinds of printing materials as a bronzing generation amount, to form an image on the printing medium by overlaying, of the plurality of kinds of printing materials, a printing material having a smaller value represented by the characteristic data on a printing material having a larger value represented by the characteristic data.

17. An information processing method of generating print data in a printing apparatus for printing an image on a printing medium by using a plurality of kinds of printing materials, comprising:

an input step of inputting image data;

a first generation step of generating image data corresponding to each of the plurality of kinds of printing materials on the basis of the image data input in the input step; and a second generation step of generating the print data on the basis of the image data generated in the first generation step, wherein in the second generation step, the print data is generated, on the basis of characteristic data representing a metallic luster characteristic of each of the plurality of kinds of printing materials obtained by measuring a tint of specularly reflected light for each of the plurality of kinds of printing materials as a bronzing generation amount, to form an image on the printing medium by overlaying, of the plurality of kinds of printing materials, a printing material having a smaller value represented by the characteristic data on a printing material having a larger value represented by the characteristic data.

18. A non-transitory computer-readable storage medium storing a computer program configured to cause a computer to execute an information processing method of generating print data in a printing apparatus for printing an image on a printing medium by using a plurality of kinds of printing materials, the information processing method comprising:

an input step of inputting image data;

a first generation step of generating image data corresponding to each of the plurality of kinds of printing materials on the basis of the image data input in the input step; and a second generation step of generating the print data on the basis of the image data generated in the first generation step, wherein in the second generation step, the print data is generated, on the basis of characteristic data representing a metallic luster characteristic of each of the plurality of kinds of printing materials obtained by measuring a tint of specularly reflected light for each of the plurality of kinds of printing materials as a bronzing generation amount, to form an image on the printing medium by overlaying, of the plurality of kinds of printing materials, a printing material having a smaller value represented by the characteristic data on a printing material having a larger value represented by the characteristic data.

* * * * *